(12) United States Patent
Hioda

(10) Patent No.: US 10,661,747 B2
(45) Date of Patent: May 26, 2020

(54) CURTAIN AIRBAG DEVICE FOR VEHICLE

(71) Applicant: TOYOTA JIDOSHA KABUSHIKI KAISHA, Toyota-shi, Aichi-ken (JP)

(72) Inventor: Seiji Hioda, Toukai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 16/023,323

(22) Filed: Jun. 29, 2018

(65) Prior Publication Data
US 2019/0047505 A1 Feb. 14, 2019

(30) Foreign Application Priority Data
Aug. 9, 2017 (JP) .................. 2017-154641

(51) Int. Cl.
| | |
|---|---|
| B60R 21/216 | (2011.01) |
| B60R 21/2334 | (2011.01) |
| B60R 21/231 | (2011.01) |
| B60R 21/232 | (2011.01) |
| B60R 21/213 | (2011.01) |

(52) U.S. Cl.
CPC .......... *B60R 21/216* (2013.01); *B60R 21/213* (2013.01); *B60R 21/232* (2013.01); *B60R 21/2334* (2013.01); *B60R 21/23138* (2013.01); *B60R 2021/2161* (2013.01); *B60R 2021/23192* (2013.01)

(58) Field of Classification Search
CPC ........ B60R 21/216; B60R 2021/23519; B60R 2021/23382; B60R 21/2334; B60R 21/232; B60R 21/213; B60R 21/23138; B60R 2021/2161; B60R 2021/23192
See application file for complete search history.

(56) References Cited

U.S. PATENT DOCUMENTS 7,922,192 B2 * 4/2011 Fukuda ................. B60R 21/232
                                                      280/730.2
8,608,193 B1 * 12/2013 Wysocki ............... B60R 21/233
                                                      280/730.2
(Continued)

FOREIGN PATENT DOCUMENTS

| JP | 2012-091650 A | 5/2012 |
|---|---|---|
| JP | 2013-086746 A | 5/2013 |

(Continued)

*Primary Examiner* — Paul N Dickson
*Assistant Examiner* — Kurtis Nielson
(74) *Attorney, Agent, or Firm* — Oliff PLC

(57) ABSTRACT

A curtain airbag device for a vehicle including; a curtain airbag that includes tabs that are anchored at a roof side portion, stowed in the roof side portion in folded state, inflates and expands toward the vehicle lower side, and includes, at a front portion, a front seat oblique collision chamber that inflates to the vehicle lower side relative to a door beltline and is superposed in the vehicle width direction with a door trim; and a swing restriction tab projecting from upper edge portion of front portion of the curtain airbag, anchored at the roof side portion at the vehicle lower side with respect to an imaginary line that runs along the curtain airbag in folded state and passes through anchoring points of the tabs, and restricts upward swinging with respect to the vehicle by the front portion of the inflated and expanded curtain airbag.

12 Claims, 11 Drawing Sheets

(56) References Cited

U.S. PATENT DOCUMENTS

| | | | | |
|---|---|---|---|---|
| 9,199,598 | B2* | 12/2015 | Tsujimoto | B60R 21/232 |
| 2003/0090093 | A1* | 5/2003 | Ikeda | B60R 21/232 |
| | | | | 280/730.2 |
| 2005/0206138 | A1* | 9/2005 | Breuninger | B60R 21/231 |
| | | | | 280/729 |
| 2011/0285117 | A1 | 11/2011 | Shamoto | |
| 2012/0098240 | A1 | 4/2012 | Kato et al. | |
| 2012/0299276 | A1* | 11/2012 | Hayashi | B60R 21/214 |
| | | | | 280/730.2 |
| 2019/0202393 | A1* | 7/2019 | Santin Navarro | B60R 21/231 |

FOREIGN PATENT DOCUMENTS

| | | |
|---|---|---|
| WO | 2010/089847 A1 | 8/2010 |
| WO | 2012/017987 A1 | 2/2012 |

* cited by examiner

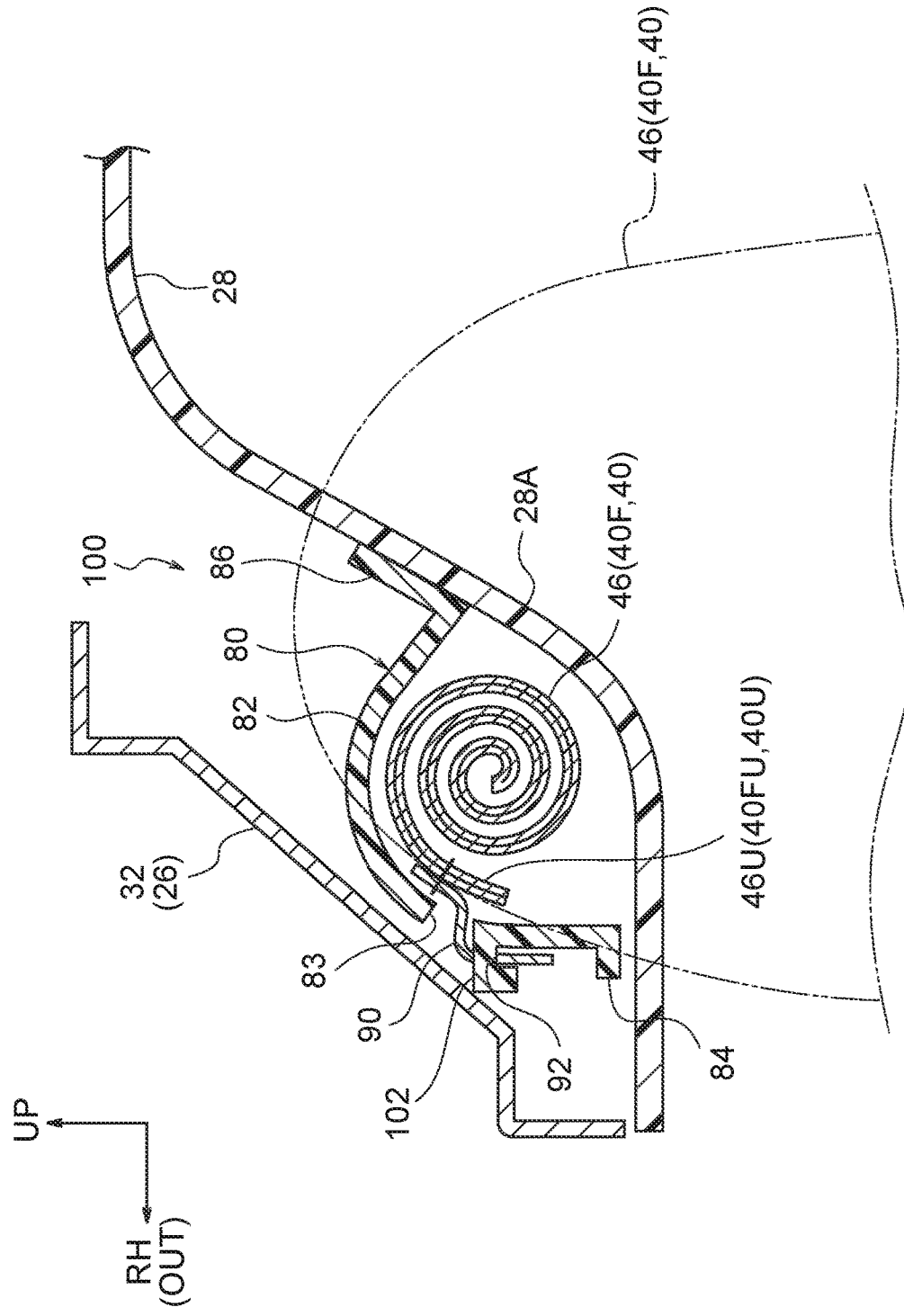

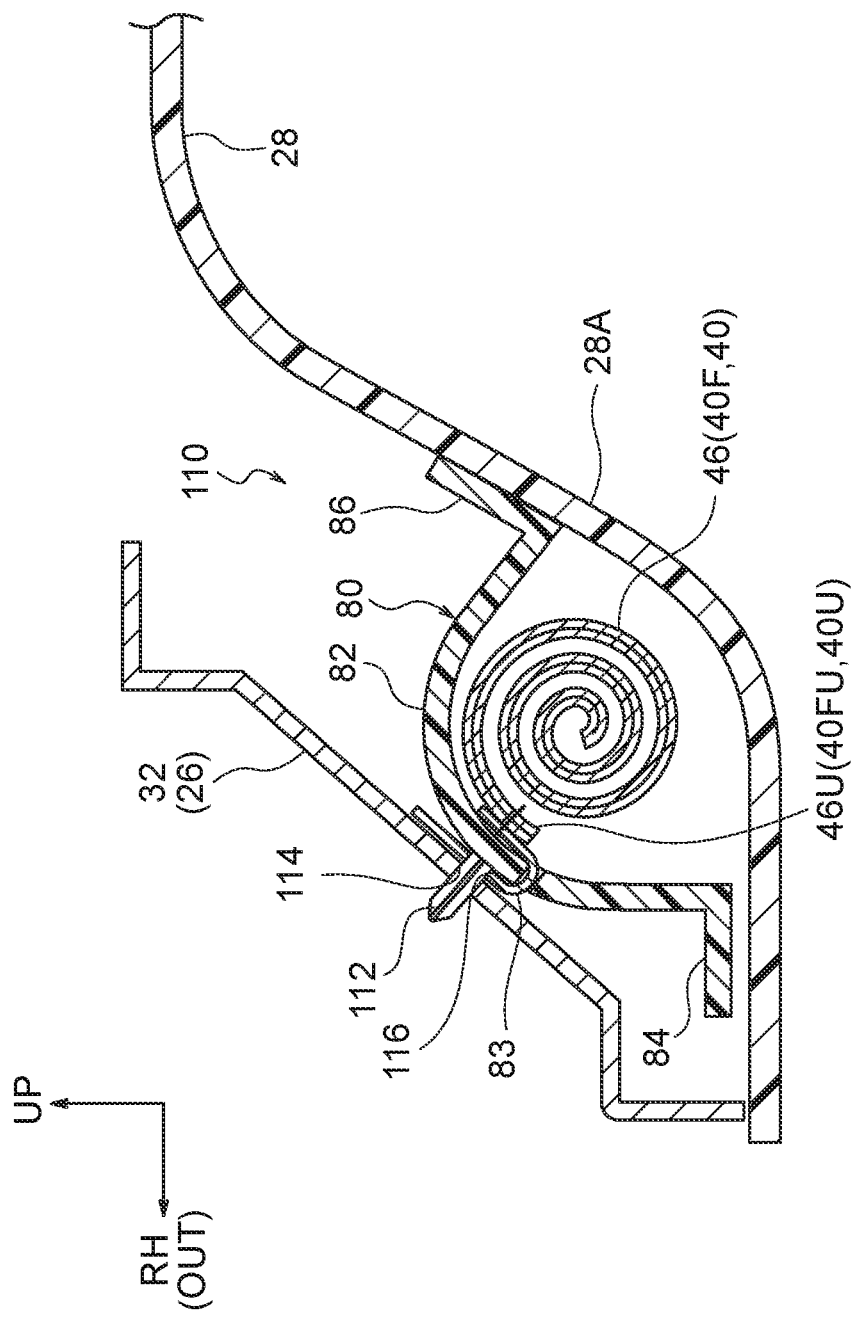

CURTAIN AIRBAG DEVICE FOR VEHICLE

CROSS-REFERENCE TO RELATED APPLICATION

This application claims priority under 35 USC 119 from Japanese Patent Application No. 2017-154641, filed on Aug. 9, 2017, the disclosure of which is incorporated by reference herein.

BACKGROUND

Technical Field

The present disclosure relates to a curtain airbag device for a vehicle.

Related Art

International Publication WO 2012/017987 recites a curtain airbag that prevents ejection of a vehicle occupant to outside a vehicle when the vehicle rolls over. This curtain airbag is provided with: a main chamber capable of inflating and expanding along a vehicle side face; a delay chamber that inflates and expands to the front of the main chamber and whose lower end is disposed lower than a door beltline of the vehicle; an ace tab that anchors an upper edge of the delay chamber at an A-pillar; and a support tab that anchors the upper edge of the delay chamber at the A-pillar in a region between the ace tab and a boundary portion between the delay chamber and the main chamber.

The ace tab applies tension to the inflated and expanded curtain airbag. The support tab inhibits the curtain airbag from moving upward during inflation and expansion. Due to the support tab, the delay chamber is inflated and expanded at an appropriate position. Therefore, in a case in which the head area of a front seat occupant collides with the delay chamber, the delay chamber interferes with a door trim properly, which prevents the delay chamber being pushed out to outside the vehicle cabin.

However, in a case in which an oblique collision of the vehicle occurs, due to a pitching action of the vehicle ("nose-diving"), the front portion side of the curtain airbag may swing relatively upward with respect to the vehicle. In such case, when the head area of a front seat occupant collides with the delay chamber, the delay chamber may not interfere with the door trim, and may be pushed out to outside the vehicle cabin, and the head area may not come into contact with the delay chamber as designed for. Therefore, there is scope for improvement in regard to improving vehicle occupant protection performance during an oblique collision of a vehicle.

SUMMARY

The present disclosure provides a curtain airbag device for a vehicle that may improve vehicle occupant protection performance during an oblique collision of the vehicle.

A first aspect of the present disclosure is a curtain airbag device for a vehicle, including; a curtain airbag including plural tabs projecting toward the vehicle upper side from an upper edge portion of the curtain airbag, the plural tabs being anchored at a roof side portion, the curtain airbag being stowed in the roof side portion in a folded state, the curtain airbag receiving a supply of gas and inflating and expanding toward the vehicle lower side, and a front portion of the curtain airbag including a front seat oblique collision chamber that inflates to the vehicle lower side relative to a door beltline and is superposed in the vehicle width direction with a door trim; and a swing restriction tab projecting from the upper edge portion of the front portion of the curtain airbag, the swing restriction tab being anchored at the roof side portion at the vehicle lower side with respect to an imaginary line that runs along the curtain airbag in the folded state and passes through anchoring points of the plurality of tabs at the roof side portion, and the swing restriction tab restricting upward swinging with respect to the vehicle by the front portion of the inflated and expanded curtain airbag.

The meaning of the term "front portion of the curtain airbag" as used in the first aspect is intended to encompass, for example, the portion that is at the vehicle front side if the airbag when unfolded in a flat shape is divided into thirds in the vehicle front-and-rear direction.

According to the first aspect of the present disclosure, the curtain airbag is stowed in the roof side portion in the folded state, with the plural tabs projecting to the vehicle upper side from the upper edge portion being anchored at the roof side portion. In a case in which, for example, an oblique collision of the vehicle is predicted or detected, the curtain airbag receives a supply of gas and inflates and expands to the vehicle lower side. The front seat oblique collision chamber included at the front portion inflates to the vehicle lower side relative to the door beltline and is superposed with the door trim in the vehicle width direction.

In the first aspect of the present disclosure, the swing restriction tab projects from the upper edge portion of the front portion of the curtain airbag. This swing restriction tab, if viewed in the vehicle width direction, is anchored to the roof side portion at the vehicle lower side with respect to the imaginary line that runs along the curtain airbag in the folded state and passes through the anchoring points of the plural tabs at the roof side portion. The swing restriction tab restricts upward swinging of the front portion of the inflated and expanded curtain airbag with respect to the vehicle. Therefore, even if the front portion of the curtain airbag starts to swing upward with respect to the vehicle due to a pitching action of the vehicle during an oblique collision, the swinging may be restricted. As a result, the front seat oblique collision chamber may be caused to interfere with the door trim properly, and the head area of a vehicle occupant may make contact with the front seat oblique collision chamber as designed for. Thus, vehicle occupant protection performance during an oblique collision of the vehicle may be improved.

A second aspect of the present disclosure, in the aspect described above, may further include: a resin case in which the folded curtain airbag is stowed, the resin case being fixed to the roof side portion and the swing restriction tab being anchored at the resin case, and the swing restriction tab may be anchored at the roof side portion via the resin case.

According to the second aspect of the present disclosure, the above-described swing restriction tab is anchored to the resin case in which the folded curtain airbag is stowed and that is fixed to the roof side portion. If an already available resin case is employed as this resin case, the structure of the present disclosure may be formed and the effects described above provided simply by applying slight modifications. Moreover, the swing restriction tab may be anchored to the resin case in advance, prior to the resin case being fixed to the roof side portion. Hence, there is no need to anchor the swing restriction tab to the roof side portion when the resin case in which the folded curtain airbag is stowed is being fixed to the roof side portion. Therefore, assembly operation workability of the resin case may be assured.

In a third aspect of the present disclosure, in the second aspect, the roof side portion may include a vehicle body panel in which an attachment hole is formed; the resin case may include an anchoring projection which is fitted into and anchored at the attachment hole; an anchoring hole may be formed in the swing restriction tab; and the anchoring protrusion may penetrate through the anchoring hole.

According to the third aspect of the present disclosure, the resin case includes the anchoring projection that is inserted into and anchored at the attachment hole formed in the vehicle body panel of the roof side portion. This anchoring projection penetrates through the anchoring hole formed in the swing restriction tab. Thus, the swing restriction tab can be anchored to the roof side portion via the resin case. The anchoring projection described above may be a projection provided at an already available resin case. Accordingly, the already available resin case may be employed as is.

In a fourth aspect of the present disclosure, in the above second aspect or the third aspect, the resin case may extend in the vehicle front-and-rear direction at the vehicle rear of an A-pillar garnish; and the swing restriction tab may project from an upper edge portion of the front seat oblique collision chamber and may be anchored at a front end portion of the resin case.

In the fourth aspect of the present disclosure, the swing restriction tab projecting from the upper edge portion of the front seat oblique collision chamber is anchored at the front end portion of the resin case. Therefore, upward swinging of the front seat oblique collision chamber with respect to the vehicle may be directly restricted by the swing restriction tab. Moreover, since the resin case described above extends in the vehicle front-and-rear direction at the vehicle rear of the A-pillar garnish, there is no need to reserve stowing space for the resin case inside the A-pillar garnish. Consequently, an increase in size of a cross section of the A-pillar (and thus a blind spot for a vehicle occupant) due to the stowing space may be avoided.

In a fifth aspect of the present disclosure, in the aspects described above, the swing restriction tab may extend toward the vehicle lower side from the upper edge portion of the front portion of the curtain airbag and may be anchored at the roof side portion.

In the fifth aspect of the present disclosure, due to the structure described above, a tensile force toward the vehicle lower side may immediately be applied from the swing restriction tab to the front portion of the curtain airbag that is starting to swing upward with respect to the vehicle. Therefore, this swinging may be restricted effectively.

According to the above aspects, a curtain airbag device for a vehicle of the present disclosure may improve vehicle occupant protection performance during an oblique collision of the vehicle.

BRIEF DESCRIPTION OF THE DRAWINGS

Exemplary embodiments will be described in detail based on the following figures, wherein:

FIG. 10 is a sectional diagram, corresponding with portions of FIG. 4, showing partial structures of a curtain airbag device for a vehicle according to a second exemplary embodiment of the present disclosure; and FIG. 11 is a sectional diagram, corresponding with portions of FIG. 4, showing partial structures of a curtain airbag device for a vehicle according to a third exemplary embodiment of the present disclosure.

DETAILED DESCRIPTION

First Exemplary Embodiment

Figure 1:
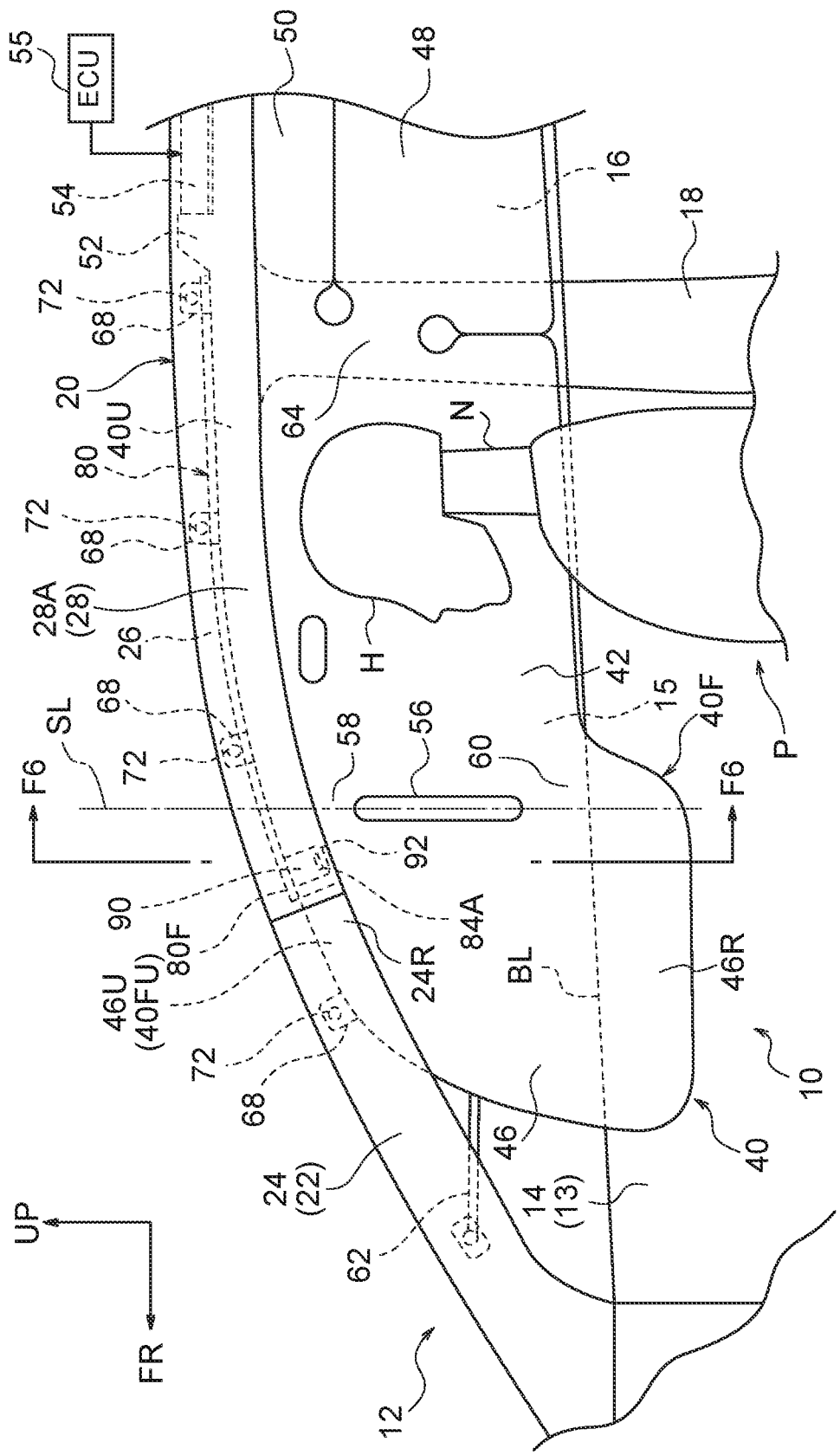
FIG. 1 is a side view in which an inflated and expanded state of a curtain airbag of a curtain airbag device for a vehicle according to a first exemplary embodiment of the present disclosure is seen from a vehicle cabin inner side.

A curtain airbag device for a vehicle 10 according to a first exemplary embodiment of the present disclosure is described below using FIG. 1 to FIG. 6. Arrow FR, arrow UP, and arrow RH (OUT) that are shown as appropriate in the drawings indicate, respectively, forward (a progress direction), upward, and rightward (outward in a width direction) of an automobile (vehicle) 12 in which the curtain airbag device for a vehicle 10 is installed. Below, where descriptions are given simply using directions to front and rear, left and right, and up and down, unless particularly specified, these refer to front and rear in the vehicle front-and-rear direction, left and right in the vehicle left-and-right direction (the vehicle width direction), and up and down in the vehicle vertical direction. Some of the reference symbols may be omitted in some of the drawings with a view to aiding viewing of the drawings. First, overall structure of the curtain airbag device for a vehicle 10 is described. Thereafter, principal portions of the present exemplary embodiment are described.

Figure 2:
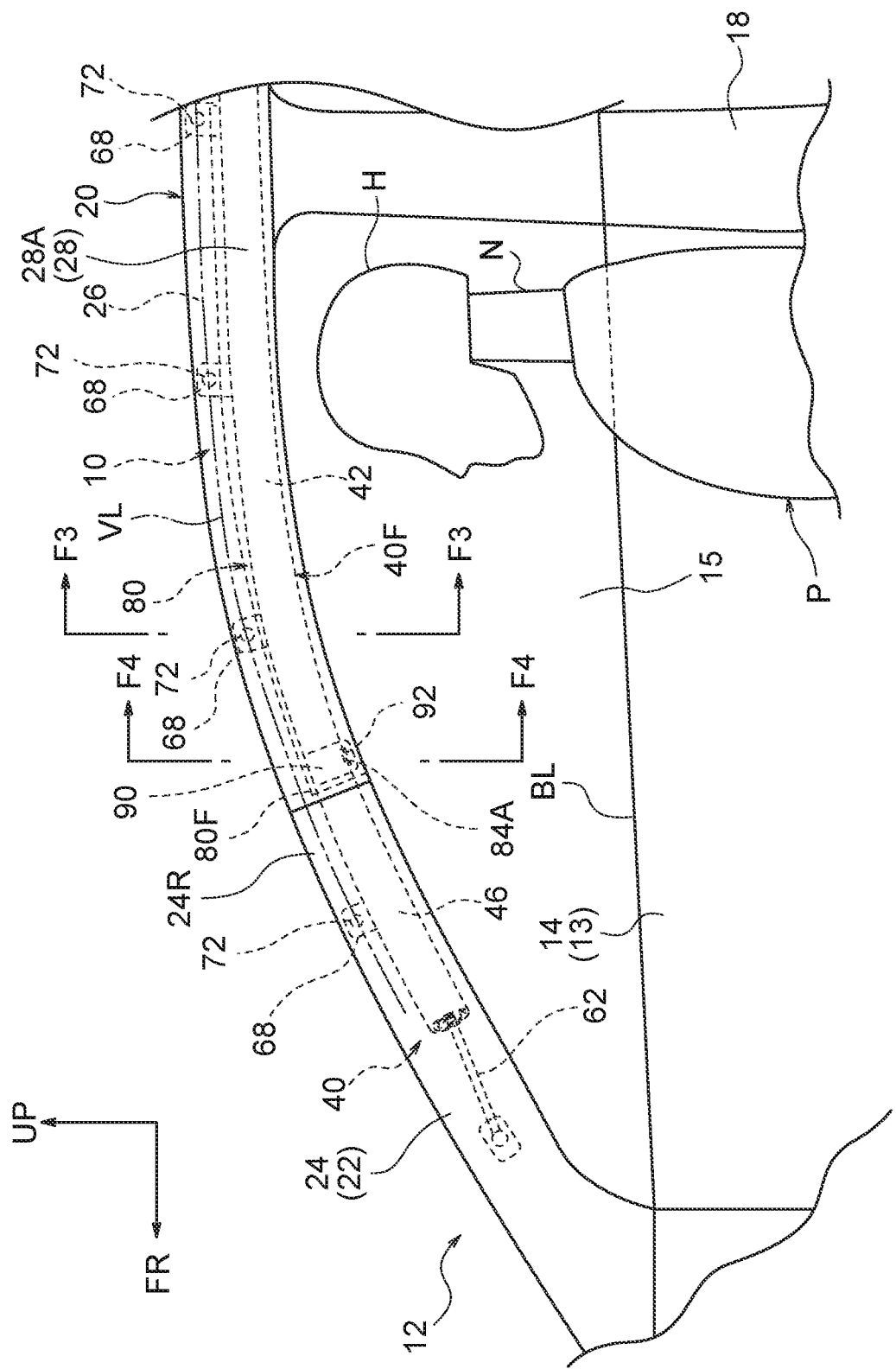
FIG. 2 is a side view in which a stowed state of the curtain airbag according to the first exemplary embodiment is seen from the vehicle cabin inner side.

As shown in FIG. 1 and FIG. 2, the curtain airbag device for a vehicle 10 is installed in, for example, a sedan-type vehicle 12. The curtain airbag device for a vehicle 10 is provided with a curtain airbag 40, an inflator 54, and an edge protector 80 fabricated of resin that serves as a resin case. The curtain airbag 40 receives a supply of gas from the inflator 54 and consequently, as illustrated in FIG. 1, inflates and expands along a vehicle cabin side portion and is formed so as to cover side window glasses 15 and 16 and a B pillar (center pillar) 18 from the vehicle cabin inner side thereof.

At usual times, as shown in FIG. 2, the curtain airbag 40 is folded into a long, narrow shape and stowed together with the inflator 54 in a roof side portion 20 that is provided at an upper end portion of the vehicle cabin side portion. In this stowed state, the curtain airbag 40 in the long, narrow shape is structured so as to extend from a rear end portion of an A-pillar (front pillar) 22, along the roof side portion 20, to an upper end side of a C-pillar (rear pillar), which is not shown in the drawings.

Figure 3:
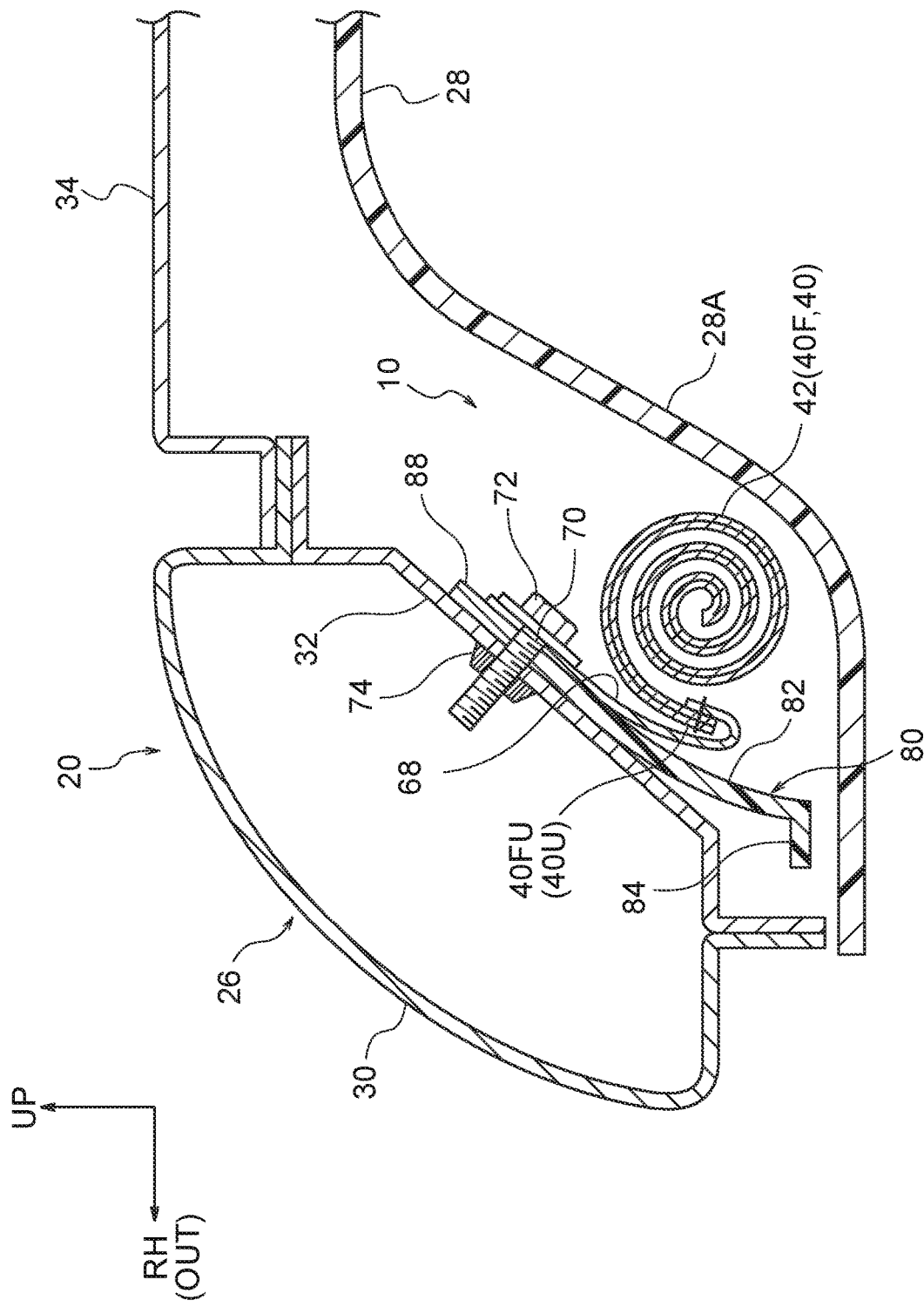
FIG. 3 is a magnified sectional diagram showing a magnification in a plane cut along line F3-F3 in FIG. 2.
Figure 4:
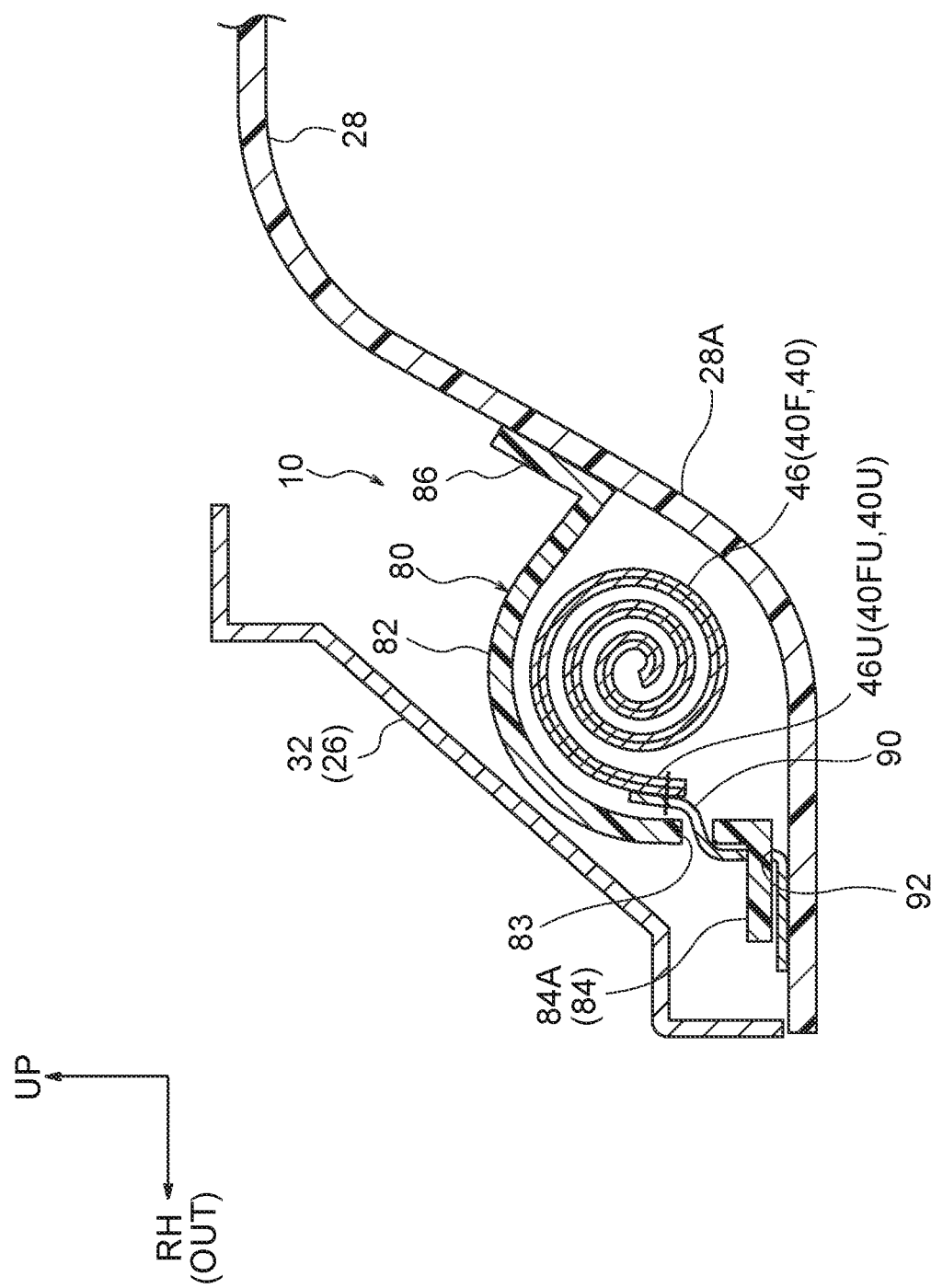
FIG. 4 is a magnified sectional diagram showing a magnification in a plane cut along line F4-F4 in FIG. 2.

As shown in FIG. 3 and FIG. 4, the roof side portion 20 includes a roof side rail 26. The roof side rail 26 is covered from the vehicle cabin inner side by a terminal portion 28A of a roof headlining 28 (not shown in FIG. 6). The folded curtain airbag 40, the inflator 54 and the edge protector 80 are stowed between the roof side rail 26 and the roof headlining 28 (not shown in FIG. 6). A front end portion of the folded curtain airbag 40 is covered from the vehicle cabin inner side thereof by an A-pillar garnish 24 provided at the A-pillar 22. The roof side rail 26 mentioned above is formed by an outer panel 30 (not shown in FIG. 4) and an inner panel 32 being joined together. Thus, the roof side rail 26 forms a chamber extending in the vehicle front-and-rear direction. A vehicle width direction end portion of a roof panel 34 (not shown in FIG. 4 and FIG. 6) is joined to an upper end portion of the roof side rail 26. The inner panel 32 corresponds to a "vehicle body panel" of the present disclosure.

The curtain airbag 40 described above is formed in a bag shape by, for example, two base cloths being superposed with one another, and outer periphery edge portions thereof sewn to one another. The base cloths are formed by, for example, cutting out cloths of nylon or polyester. Methods of fabricating the curtain airbag 40 are not limited by the above description; the curtain airbag 40 may be integrally woven into a bag by a one-piece woven process.

The curtain airbag 40 is provided with a front seat side collision chamber 42, a rear seat side collision chamber that is not shown in the drawings, a front seat oblique collision chamber (a front seat rollover chamber) 46, a rear seat oblique collision chamber (a rear seat rollover chamber) 48 and a gas supply channel 50. The front seat oblique collision chamber 46 is provided at the front side of the front seat side collision chamber 42. The rear seat oblique collision chamber 48 is provided to extend between the front seat side collision chamber 42 and the rear seat side collision chamber. The gas supply channel 50 puts the front seat side collision chamber 42 and the rear seat side collision chamber into fluid communication with one another.

The front seat side collision chamber 42 inflates and expands to the vehicle width direction outer side with respect to the head area H of a front seat occupant P, and is interposed between the head area H and the vehicle cabin side portion. The rear seat side collision chamber inflates and expands to the vehicle width direction outer side with respect to the head area of a rear seat occupant (not shown in the drawings) and is interposed between the head area of the rear seat occupant and the vehicle cabin side portion. The gas supply channel 50 is provided in the vehicle rear vicinity of a front-and-rear direction middle portion of an upper end portion of the curtain airbag 40, and extends in the front-and-rear direction of the curtain airbag 40. A tubular connection channel 52 projects to the upper side from an upper end portion of the gas supply channel 50. The inflator 54, which is a cylinder-type inflator (gas generation device), is connected to a rear end portion of the connection channel 52. The inflator 54 is fixed to the roof side rail 26 via a bracket (not shown in the drawings). A diffuser (not shown in the drawings) is disposed inside the connection channel 52 and the gas supply channel 50. The gas generated by the inflator 54 is distributed in the gas supply channel 50 toward the vehicle front side and the vehicle rear side.

The front seat oblique collision chamber 46 inflates and expands at the front of the front seat side collision chamber 42 and constitutes a front end portion of the curtain airbag 40. The front seat oblique collision chamber 46 protects (restrains) the head area H of the front seat occupant P when an oblique collision or a rollover occurs. As shown in FIG. 1, when inflated and expanded, the front seat oblique collision chamber 46 inflates to the vehicle lower side relative to a door beltline BL. In the inflated and expanded state of the front seat oblique collision chamber 46, an overlap portion 46R provided at a lower portion of the front seat oblique collision chamber 46 is structured so as to be superposed (overlap) in the vehicle width direction with a door trim 14 of a front side door 13.

The front seat oblique collision chamber 46 described above is partially partitioned from the front seat side collision chamber 42 by a non-inflating portion 56 in an island shape, which is formed by the base cloths of the curtain airbag 40 being sewn together. Constricted channels 58 and 60 are formed, respectively, above and below the non-inflating portion 56. The front seat side collision chamber 42 and the front seat oblique collision chamber 46 are put into fluid communication with one another by the constricted channels 58 and 60. A tension belt 62 spans between a front edge portion of the front seat oblique collision chamber 46 and the A-pillar 22.

The rear seat oblique collision chamber 48 inflates and expands between the front seat side collision chamber 42 and the rear seat side collision chamber, and protects (restrains) the head area of the rear seat occupant when an oblique collision or a rollover occurs. The rear seat oblique collision chamber 48 is put into fluid communication with the front seat side collision chamber 42 via a constricted channel 64 formed between the rear seat oblique collision chamber 48 and the front seat side collision chamber 42.

A plural number of tabs 68 are provided in a row in the vehicle front-and-rear direction at an upper edge portion 40U of the curtain airbag 40 with the structure described above. The plural tabs 68 project to the vehicle upper side from the upper edge portion 40U of the curtain airbag 40. The tabs 68 are formed by, for example, cutting a base cloth similar to the base cloths of the curtain airbag 40 into long, narrow rectangular shapes and joining the same to the upper edge portion 40U of the curtain airbag 40 by means such as sewing or the like. The tabs 68 are fixed (anchored) at the A-pillar 22 and the roof side rail 26 by fasteners (see the bolt 72 and weld nut 74 illustrated in FIG. 3). Each bolt 72 penetrates through a circular anchoring hole 70 that is formed in the tab 68 (see FIG. 3). Herein, the plural tabs 68 may be projected integrally from the upper edge portion 40U of the curtain airbag 40, and the fasteners may be clips or the like.

The curtain airbag 40 with the structure described above is folded and formed into the long, narrow shape by, for example, a predetermined folding method including at least one of roll folding and bellows folding. Thus, the curtain airbag 40 is formed into a structure that can be stowed in the edge protector 80 illustrated in FIG. 2 to FIG. 6. The edge protector 80 prevents edge portions formed at the inner panel 32 of the roof side rail 26 and the like from coming into contact with the curtain airbag 40. The edge protector 80 is formed in a long, narrow shape of, for example, a soft synthetic resin material (for example, a thermoplastic olefin). The edge protector 80 is disposed at the roof side portion 20 in an attitude in which the length direction of the edge protector 80 runs in the vehicle front-and-rear direction. The edge protector 80 extends in the vehicle front-and-rear direction at the vehicle rear of the A-pillar garnish 24. A front end portion 80F of the edge protector 80 is disposed in a vicinity at the vehicle rear of a rear end portion (upper end portion) 24R of the A-pillar garnish 24. In FIG. 1 and FIG. 2, the edge protector 80 is depicted schematically.

Figure 6:
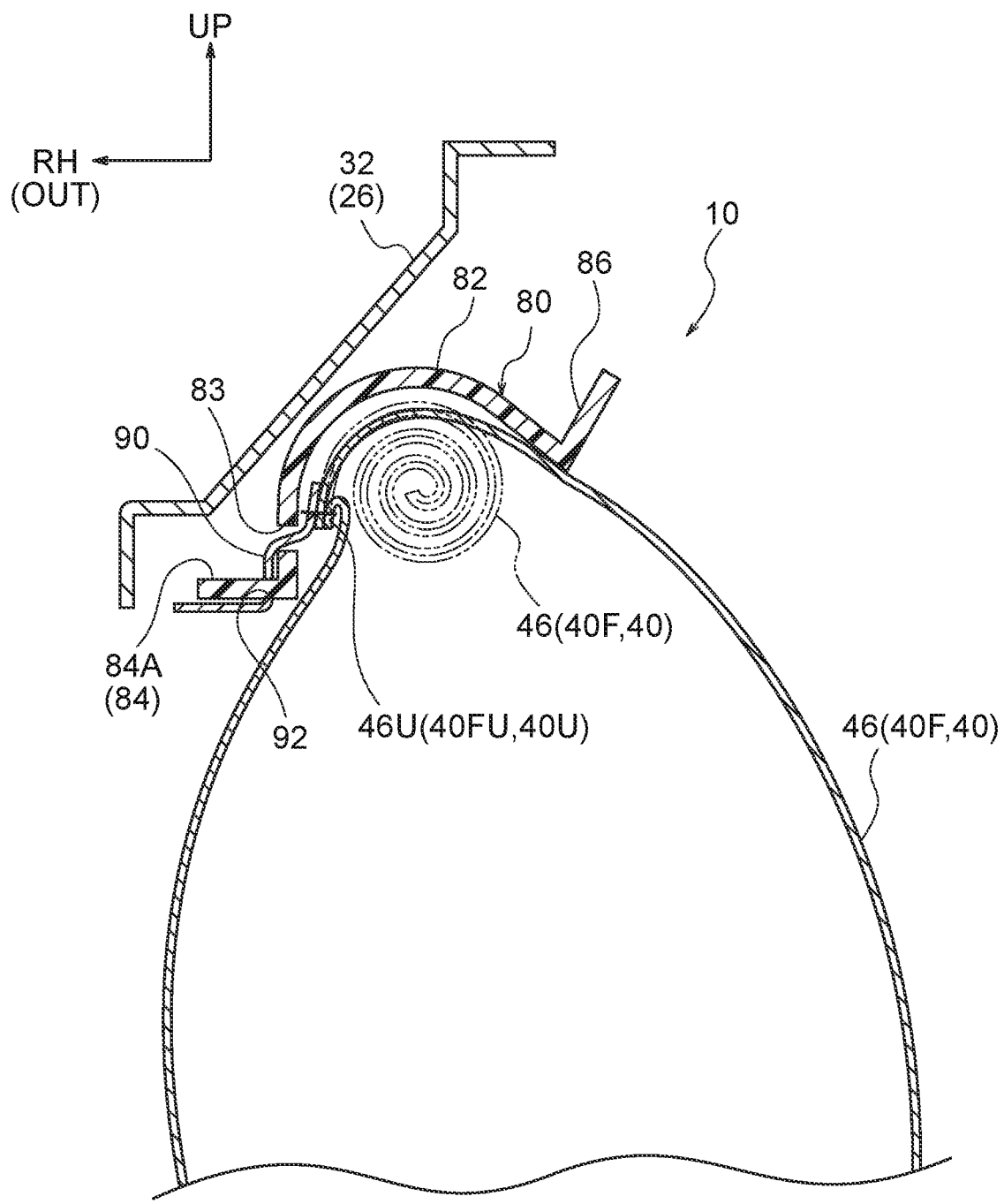
FIG. 6 is a magnified sectional diagram showing a magnification in a plane cut along line F6-F6 in FIG. 1.

As shown in FIG. 4 and FIG. 6, the edge protector 80 includes a protector main body 82, an outer side flange 84 and an inner side flange 86. The protector main body 82 is formed in an inverted "U" shape in cross section, of which the vehicle lower side and vehicle width direction inner side is open in a vehicle front-and-rear direction view. The outer side flange 84 and inner side flange 86 are projected to opposite sides from one another from opening edges of the protector main body 82. The outer side flange 84 extends outward in the vehicle width direction from the opening edge of the protector main body 82 that is at the vehicle width direction outer side thereof. The inner side flange 86 extends diagonally toward the vehicle upper side and vehicle width direction inner side from the opening edge of the protector main body 82 that is at the vehicle width direction inner side. The outer side flange 84 and inner side flange 86 are in contact with or close to a back face (upper face) of the terminal portion 28A of the roof headlining 28, and oppose the back face.

The edge protector 80 is further provided with a plural number of plate-shaped fixing pieces 88 (see FIG. 3, but not shown in FIG. 1 and FIG. 2) that project to the vehicle upper side from the protector main body 82. The plural fixing pieces 88 are arrayed in the vehicle front-and-rear direction with a suitable spacing. The fixing pieces 88 are superposed with the inner panel 32 of the roof side rail 26 from the vehicle width direction inner side thereof. The fixing pieces 88 are disposed between the plural respective tabs 68 of the curtain airbag 40 and the inner panel 32, and are fixed (anchored) to the inner panel 32 using the bolts 72 and weld nuts 74 that fix the plural tabs 68 to the inner panel 32 (see FIG. 3). As shown in FIG. 3, locations of the protector main body 82 at which the fixing pieces 88 are provided are formed in a circular arc shape in cross section.

The curtain airbag 40, inflator 54 and edge protector 80 described above are respectively provided at both width direction sides of the vehicle 12. That is, the curtain airbag device for a vehicle 10 is equipped with a left and right pair of the curtain airbag 40, a left and right pair of the inflator 54, and a left and right pair of the edge protector 80. Herein, the curtain airbag 40, inflator 54 and edge protector 80 at the vehicle left side are not shown in the drawings.

As shown in FIG. 1, the curtain airbag device for a vehicle 10 is equipped with an airbag ECU 55, which is electronically connected with each inflator 54. A side collision sensor, a rollover sensor, and an oblique collision sensor (none of which is shown in the drawings) are electronically connected to the airbag ECU 55. The side collision sensor is configured to predict or detect (the unavoidability of) a side collision of the vehicle 12 and output a side collision detection signal to the airbag ECU 55. The rollover sensor is configured to predict or detect (the unavoidability of) a rollover of the vehicle 12 and output a rollover detection signal to the airbag ECU 55. The oblique collision sensor is configured to predict or detect (the unavoidability of) an oblique collision of the vehicle 12 and output an oblique collision detection signal to the airbag ECU 55. In the present exemplary embodiment, the meaning of the term "oblique collision" (an MDB impact or an oblique impact) includes, for example, a diagonal collision from the front as defined by the National Highway Traffic Safety Administration (NHTSA) (for example, a collision at a relative angle of 15° with the other party of the collision and an overlap amount of around 35% in the vehicle width direction). In this exemplary embodiment, the relative speed of an oblique collision is assumed to be, as an example, 90 km/h.

When a side collision detection signal or an oblique collision detection signal is inputted, the airbag ECU 55 is configured to activate the inflator 54 at the side collision side or oblique collision side (the nearer side to the collision in both cases). Accordingly, when a side collision or oblique collision occurs at the vehicle 12, the curtain airbag 40 at the nearer side receives a supply of gas and inflates and expands. When a rollover detection signal is inputted, the airbag ECU 55 is configured to activate the inflator 54 at each of the two vehicle width direction sides. If a rollover detection signal is inputted after a side collision or after an oblique collision, the airbag ECU 55 is configured to activate the inflator 54 at the opposite side (the further side) from the nearer side whose inflator 54 has already been activated.

When the inflator 54 is activated, gas from the inflator 54 is distributed towards the front side and the rear side of the gas supply channel 50. The distributed gas is supplied to the front seat side collision chamber 42 and the rear seat side collision chamber, and the front seat side collision chamber 42 and rear seat side collision chamber inflate. As a result, the curtain airbag 40 expands toward the vehicle lower side along the vehicle cabin side face while pushing the terminal portion 28A of the roof headlining 28 down toward the lower side.

A portion of the gas supplied to the front seat side collision chamber 42 is supplied through the constricted channels 58 and 60 to the front seat oblique collision chamber 46. Thus, the front seat oblique collision chamber 46 inflates some time later than the front seat side collision chamber 42 and the rear seat side collision chamber. A further portion of the gas supplied to the front seat side collision chamber 42 is supplied through the constricted channel 64 to the rear seat oblique collision chamber 48. Thus, the rear seat oblique collision chamber 48 inflates some time later than the front seat side collision chamber 42 and the rear seat side collision chamber. In other words, the front seat oblique collision chamber 46 and the rear seat oblique collision chamber 48 are configured as delay chambers. Further, when an oblique collision detection signal is inputted to the airbag ECU 55, a front collision airbag (not shown in the drawings) inflates and expands at the front of the front seat occupant P. Next, principal portions of the present exemplary embodiment are described.

In the present exemplary embodiment, as shown in FIG. 1, FIG. 2 and FIG. 4 to FIG. 6, a swing restriction tab 90 is provided at a front portion 40F of the curtain airbag 40. In the present exemplary embodiment, the front portion 40F of the curtain airbag 40 is, for example, the portion that is at the vehicle front side if the curtain airbag 40 when unfolded in a flat shape is divided into thirds in the vehicle front-and-rear direction, which is a portion that includes the front end side of the front seat side collision chamber 42 and the front seat oblique collision chamber 46.

The swing restriction tab 90 mentioned above projects from an upper edge portion 40FU of the front portion 40F of the curtain airbag 40 (in this exemplary embodiment, from an upper edge portion 46U of the front seat oblique collision chamber 46). Similarly to the plural tabs 68 described above, the swing restriction tab 90 is formed by, for example, cutting a cloth similar to the base cloth of the curtain airbag 40 into a long, narrow rectangular shape, and is joined to the upper edge portion 46U of the front seat oblique collision chamber 46 by means such as sewing or the like. As shown in FIG. 1, the swing restriction tab 90 is disposed at the vehicle front side relative to the center in the vehicle front-and-rear direction of the non-inflating portion 56 of the inflated and expanded curtain airbag 40 (see the single-dot chain line SL in FIG. 1), but is disposed at the vehicle rear side relative to the rear end portion 24R of the A-pillar garnish 24. A position in the vehicle front-and-rear direction at which the swing restriction tab 90 is disposed coincides with a position in the vehicle front-and-rear direction at which the front end portion 80F of the edge protector 80 is disposed.

Figure 5:
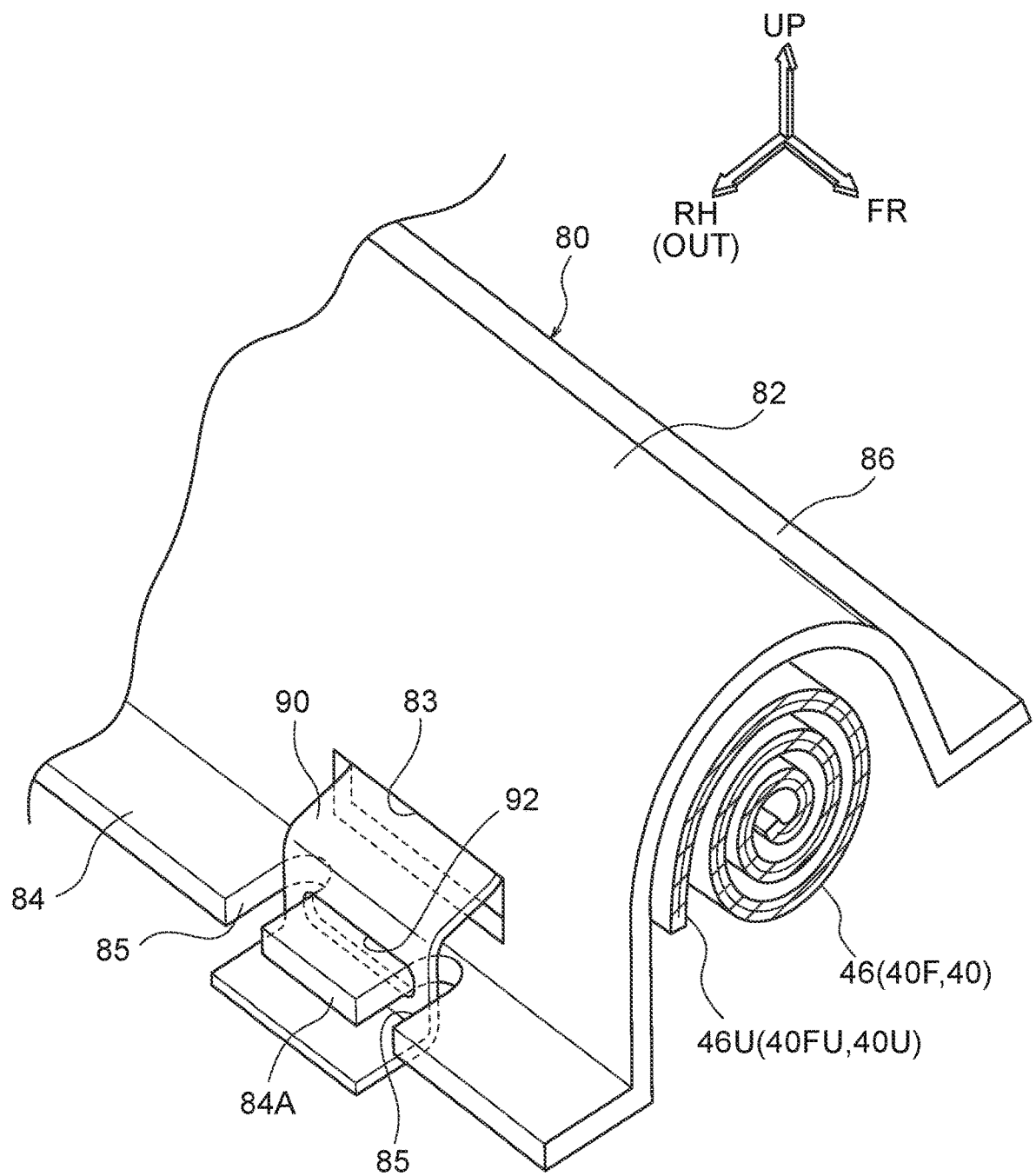
FIG. 5 is a perspective view showing surroundings of a swing restriction tab of the curtain airbag and structures of a front end portion of a resin case.

The swing restriction tab 90 extends toward the vehicle lower side from the upper edge portion 46U of the front seat oblique collision chamber 46 and is anchored at the roof side portion 20. To be specific, as shown in FIG. 4 to FIG. 6, a penetrating hole 83 is formed in the front end portion 80F of the edge protector 80, in a vicinity of the opening edge that is at the vehicle width direction outer side of the protector main body 82. The penetrating hole 83 is formed in a long, narrow rectangular shape that is elongated in the vehicle front-and-rear direction. The swing restriction tab 90 extends toward the vehicle lower side from the upper edge portion 46U of the front seat oblique collision chamber 46, and extends through the penetrating hole 83 to the vehicle width direction outer side of the protector main body 82.

An anchoring portion 84A is formed at the outer side flange 84, at the vehicle lower side of the penetrating hole 83. The anchoring portion 84A is formed by a front and rear pair of notch portions 85 being formed in the outer side flange 84. At the front and rear pair of notch portions 85, portions of the outer side flange 84 are notched from the vehicle width direction outer side. The anchoring portion 84A extends to the vehicle width direction outer side between the front and rear pair of notch portions 85. An anchoring hole 92 is formed at a distal end side of the swing restriction tab 90 to correspond with the anchoring portion 84A. The anchoring hole 92 is formed as a long hole that is elongated in the vehicle front-and-rear direction. By the anchoring portion 84A being inserted into the anchoring hole 92, the swing restriction tab 90 is anchored at the anchoring portion 84A, and thus at the edge protector 80. Therefore, the swing restriction tab 90 is anchored at the roof side portion 20 via the edge protector 80.

If viewed in the vehicle width direction, the swing restriction tab 90 is anchored at the roof side portion 20 at the vehicle lower side with respect to an imaginary line VL that runs along the curtain airbag 40 in the folded state and passes through anchoring points of the plural tabs 68 to the roof side portion 20 (i.e., the centers of the anchoring holes 70 formed in the tabs 68 (see FIG. 3)). In the present exemplary embodiment, seen in the vehicle width direction, the swing restriction tab 90 is anchored at the roof side portion 20 in a region that coincides with the curtain airbag 40 in the folded state or a region slightly to the vehicle lower side relative to that region. If the curtain airbag 40 is folded by roll folding, the above-mentioned imaginary line VL is an imaginary line along the axis of the curtain airbag 40 in the folded state.

The swing restriction tab 90 described above is specified with dimensions so as to restrict upward swinging with respect to the vehicle 12 by the front portion 40F of the inflated and expanded curtain airbag 40. To be specific, the dimensions are specified such that the swing restriction tab 90 is stretched between the upper edge portion of the front seat oblique collision chamber 46 and the anchoring portion 84A during the inflation and expansion of the curtain airbag 40, and such that the swing restriction tab 90 applies a tensile force toward the vehicle lower side to the upper edge portion 46U of the front seat oblique collision chamber 46. Thus, the swing restriction tab 90 is structured such that the upper edge portion 46U of the front seat oblique collision chamber 46 is continuously tensed toward the vehicle lower side by the swing restriction tab 90 during the inflation and expansion of the curtain airbag 40. Hence, when the front portion 40F of the curtain airbag 40 starts to swing upward with respect to the vehicle 12, the above-mentioned tensile force that the upper edge portion 46U of the front seat oblique collision chamber 46 receives from the swing restriction tab 90 increases.

The swing restriction tab 90 need not pull the upper edge portion 46U of the front seat oblique collision chamber 46 toward the vehicle lower side continuously during the inflation and expansion of the curtain airbag 40. That is, it is sufficient if, at least, the swing restriction tab 90 immediately applies tensile force toward the vehicle lower side to the upper edge portion of the front portion 40F of the curtain airbag 40 when the front portion 40F of the curtain airbag 40 starts to swing upward with respect to the vehicle 12. In other words, it is sufficient if the dimensions are specified such that the swing restriction tab 90 is stretched prior to the plural tabs 68 when the front portion 40F of the curtain airbag 40 starts to swing upward with respect to the vehicle 12.

In the present exemplary embodiment, the swing restriction tab 90 projects from the upper edge portion 46U of the front seat oblique collision chamber 46. However, the present disclosure is not limited thereto. The swing restriction tab 90 may project from the upper edge portion 40FU of the front portion 40F of the curtain airbag 40 (i.e., the portion that is at the vehicle front side if the curtain airbag 40 when unfolded in a flat shape is divided into thirds in the vehicle front-and-rear direction); the swing restriction tab 90 may project from the upper edge portion of a front end portion of the front seat side collision chamber 42.

Now, operation of the present exemplary embodiment are described.

In the curtain airbag device for a vehicle 10 with the structure described above, the curtain airbag 40 is stowed in the roof side portion 20 of the vehicle 12 in the folded state, with the plural tabs 68 projecting toward the vehicle upper side from the upper edge portion 40U anchored at the roof side portion 20. When an oblique collision of the vehicle 12 is predicted or detected, the curtain airbag 40 receives a supply of gas, inflates and expands toward the vehicle lower side, and the front seat oblique collision chamber 46 included at the front portion 40F inflates to the vehicle lower side relative to the door beltline BL and is superposed in the vehicle width direction with the door trim 14.

In the present exemplary embodiment, the swing restriction tab 90 projects from the upper edge portion 40FU of the front portion 40F of the curtain airbag 40. If viewed in the vehicle width direction, the swing restriction tab 90 is anchored to the roof side portion 20 at the vehicle lower side with respect to the imaginary line VL that runs along the curtain airbag 40 in the folded state and passes through the anchoring points of the plural tabs 68 to the roof side portion 20. The swing restriction tab 90 restricts upward swinging with respect to the vehicle 12 by the front portion 40F of the inflated and expanded curtain airbag 40. Therefore, even in a case in which the front portion 40F of the curtain airbag 40 starts to swing upward with respect to the vehicle 12 due to a pitching action of the vehicle 12 during an oblique collision, this swinging may be restricted. As a result, the front seat oblique collision chamber 46 may be caused to interfere with the door trim 14 properly, and the head area H of a front seat occupant P may come into contact with the front seat oblique collision chamber 46 as designed for. Thus, vehicle occupant protection performance during an oblique collision of the vehicle 12 may be improved.

Figure 7:
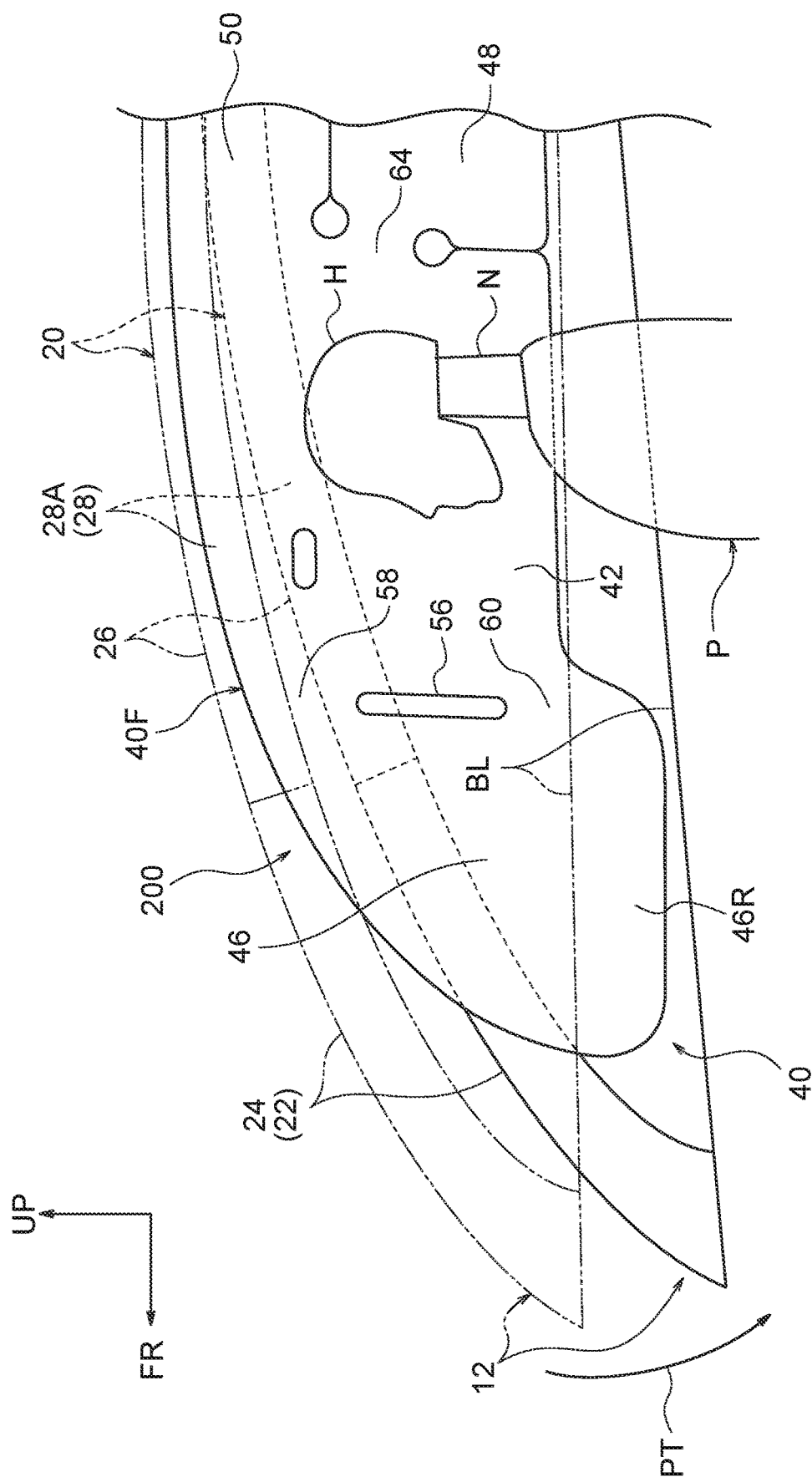
FIG. 7 is a side view, seen from a vehicle cabin inner side, of a state in which a curtain airbag according to a comparative example is swinging upward with respect to the vehicle due to a pitching action of the vehicle at a time of inflation and expansion.
Figure 8:
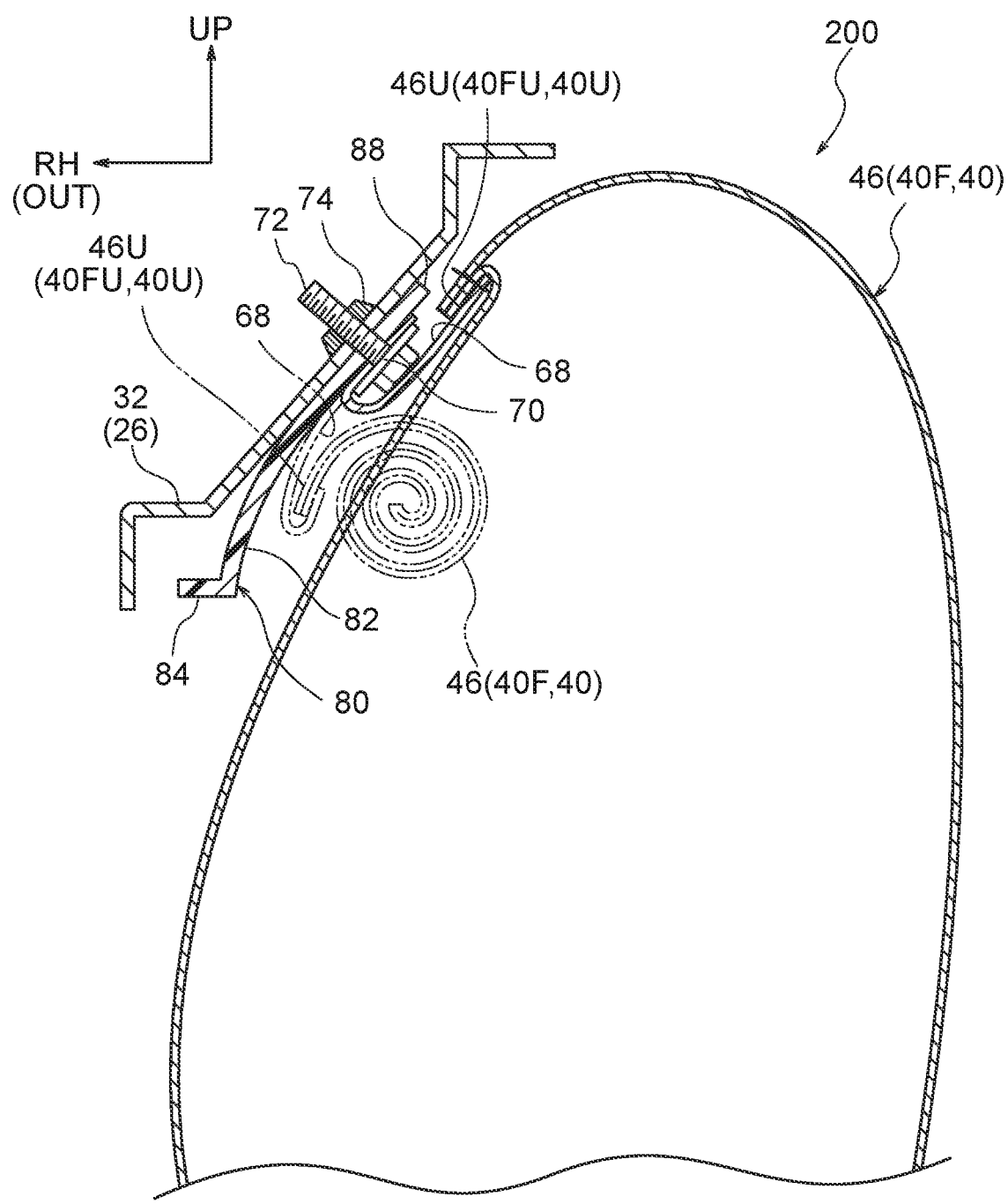
FIG. 8 is a sectional diagram, seen from a vehicle front side, of the state in which the curtain airbag according to the comparative example is swinging upward with respect to the vehicle due to the pitching action of the vehicle at the time of inflation and expansion.
Figure 9:
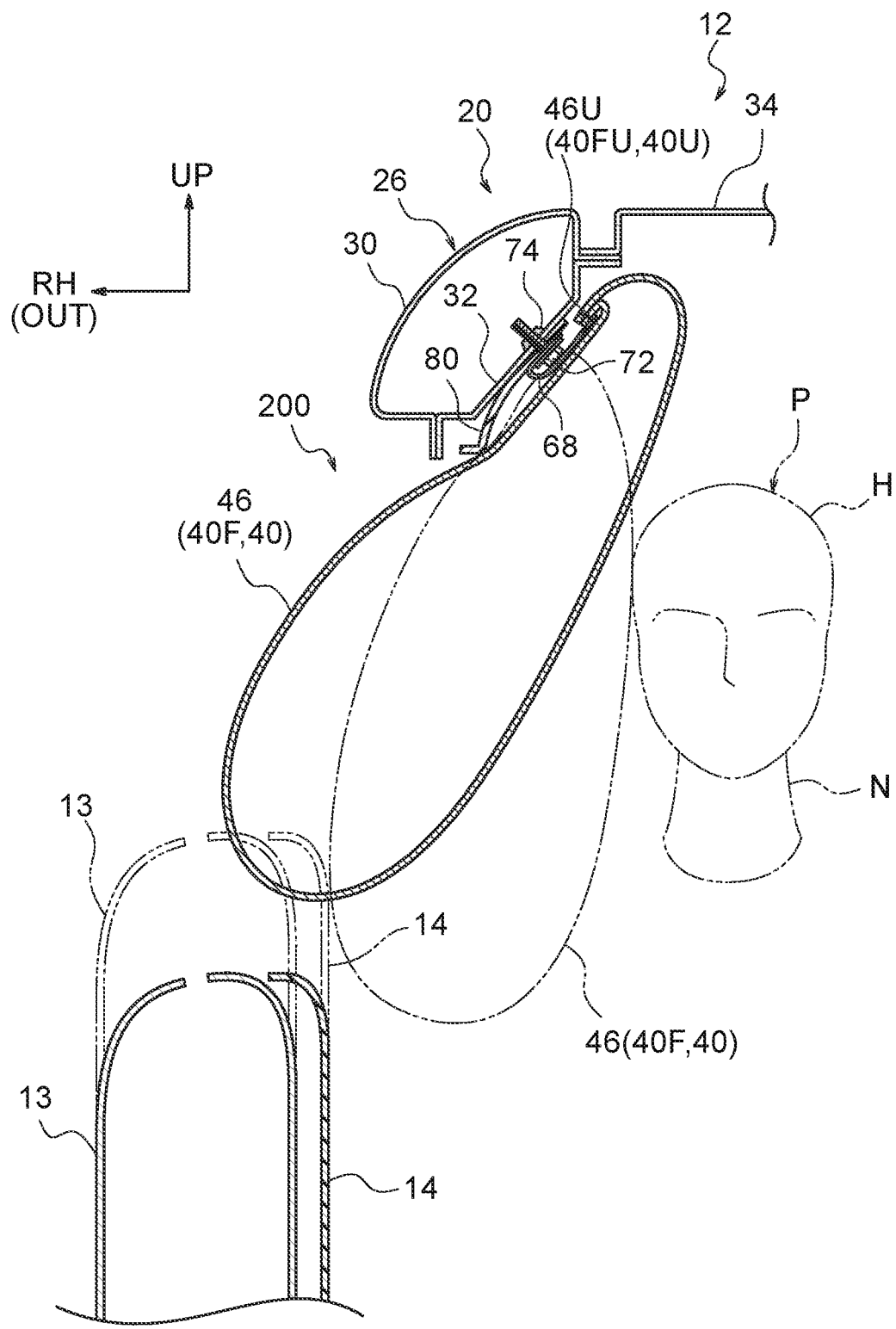
FIG. 9 is a sectional diagram, seen from the vehicle front side, of a state in which a front seat oblique collision chamber of the curtain airbag according to the comparative example is pushed out to outside the vehicle cabin.

A supplementary description of the effect described above is given using a curtain airbag device for a vehicle 200 that is shown in FIG. 7 to FIG. 9 (below referred to as "the comparative example 200"). The comparative example 200 has a basically similar structure to the curtain airbag device for a vehicle 10 according to the present exemplary embodiment. However, the comparative example 200 is not provided with the swing restriction tab 90 according to the present exemplary embodiment, and the upper edge portion 40U of the curtain airbag 40, including the upper edge portion 46U of the front seat oblique collision chamber 46, is anchored to the roof side portion 20 only via the plural tabs 68 (see FIG. 8 and FIG. 9, but not shown in FIG. 7).

In the comparative example 200, the curtain airbag 40 swings upward with respect to the vehicle 12 due to a pitching action of the vehicle 12 during an oblique collision ("nose-diving"; see arrow PT in FIG. 7 and the vehicle 12 depicted by solid lines in FIG. 7). For convenience of description, the pitching action of the vehicle 12 is exaggerated in FIG. 7. Further, the plural tabs 68 are not shown in FIG. 7.

When the above-mentioned swinging occurs, the plural tabs 68 fold back toward the upper side as illustrated in FIG. 8 and FIG. 9, thus allowing the upward swinging of the front portion 40F of the curtain airbag 40 with respect to the vehicle 12. At this time, as illustrated in FIG. 9, when the head area H of a front seat occupant P collides with (comes into contact with) the front seat oblique collision chamber 46, the front seat oblique collision chamber 46 may not interfere with the door trim 14 but be pushed out to outside the vehicle cabin, and the head area H may not come into contact with the front seat oblique collision chamber 46 as designed for.

That is, when an oblique collision occurs, the head area H of the front seat occupant P plunges between the front seat oblique collision chamber 46 and the front collision airbag (not shown in the drawings), and is restrained from the left and right sides thereof by the front seat oblique collision chamber 46 and the front collision airbag. At this time, if the head area H does not come into contact with the front seat oblique collision chamber 46 as designed for, then the head area H is subject to restraining force only from the front collision airbag. As a result, a twisting force about the axis of the neck area N may act on the head area H. In the present exemplary embodiment, by contrast, since the head area H of the vehicle front seat occupant P may be caused to come into contact with the front seat oblique collision chamber 46 as designed for.

In the present exemplary embodiment, the swing restriction tab 90 is anchored to the edge protector 80 that is fabricated of resin, in which the folded curtain airbag 40 is stowed, and that is fixed to the roof side portion 20. If an already available edge protector is employed as the edge protector 80, the structure of the present exemplary embodiment may be formed and the effects described above provided simply by applying slight modifications. Moreover, the swing restriction tab 90 may be anchored to the edge protector 80 in advance, prior to the edge protector 80 being fixed to the roof side portion 20. Therefore, there is no need to anchor the swing restriction tab 90 to the roof side portion 20 when the edge protector 80 in which the folded curtain airbag 40 is stowed is being fixed to the roof side portion 20. Therefore, assembly operation workability of the edge protector 80 may be assured.

That is, when the swing restriction tab 90 is anchored at the roof side portion 20 in a region that coincides in a vehicle width direction view with the curtain airbag 40 in the folded state or a region slightly to the vehicle lower side relative to that region, direct anchoring of the swing restriction tab 90 to the roof side portion 20 during assembly of the edge protector 80 to the roof side portion 20 is difficult. In contrast, in the present exemplary embodiment, since there is no need to directly anchor the swing restriction tab 90 to the roof side portion 20, complication in assembly operations of the edge protector 80 may be avoided.

In the present exemplary embodiment, the swing restriction tab 90 projecting from the upper edge portion 46U of the front seat oblique collision chamber 46 is anchored at the front end portion 80F of the edge protector 80. Therefore, upward swinging of the front seat oblique collision chamber 46 with respect to the vehicle 12 may be directly restricted by the swing restriction tab 90. Moreover, since the edge protector 80 extends in the vehicle front-and-rear direction at the vehicle rear of the A-pillar garnish 24, there is no need to reserve stowing space for the edge protector 80 inside the A-pillar garnish 24. Consequently, an increase in size of a cross section of the A-pillar (and thus a blind spot for a vehicle occupant) due to that stowing space may be avoided.

In the present exemplary embodiment, the swing restriction tab 90 extends toward the vehicle lower side from the upper edge portion 40FU of the front portion 40F of the curtain airbag 40 and is anchored at the roof side portion 20. Due to this structure, the front portion 40F of the curtain airbag 40 that starts to swing upward with respect to the vehicle 12 may immediately receive a tensile force toward the vehicle lower side from the swing restriction tab 90. Therefore, in the present exemplary embodiment, the swinging may be restricted effectively.

Now, alternative exemplary embodiments of the present disclosure are described. Structures and operations that are basically the same as in the first exemplary embodiment are assigned the same reference numerals as in the first exemplary embodiment and are not described.

Second Exemplary Embodiment

FIG. 10 shows a sectional diagram, corresponding with portions of FIG. 4, of partial structure of a curtain airbag device for a vehicle 100 according to a second exemplary embodiment of the present disclosure. In FIG. 10, the inflated and expanded state of the front seat oblique collision chamber 46 is depicted by two-dot chain lines. This exemplary embodiment has a basically similar structure to the first exemplary embodiment, but the anchoring position of the swing restriction tab 90 at the edge protector 80 differs from the first exemplary embodiment.

The edge protector 80 according to this exemplary embodiment is equipped with an anchoring portion 102 that projects to the vehicle width direction outer side from the protector main body 82 at the vehicle upper side of the outer side flange 84. The anchoring portion 102 is formed in the vicinity of a vertical direction middle portion of the edge protector 80. A distal end side of the anchoring portion 102 is inflected toward the vehicle lower side. Another of the penetrating hole 83, similar to the penetrating hole 83 according to the first exemplary embodiment, is formed in the protector main body 82 at the vehicle upper side of the anchoring portion 102. The swing restriction tab 90 is passed through this penetrating hole 83 and the anchoring portion 102 is inserted into the anchoring hole 92 of the swing restriction tab 90. Thus, the swing restriction tab 90 is anchored at the protector main body 82, and the swing restriction tab 90 is anchored at the roof side portion 20 via the edge protector 80. In this exemplary embodiment, although the swing restriction tab 90 extends to the vehicle width direction outer side from the upper edge portion 46U of the front seat oblique collision chamber 46 and is anchored at the edge protector 80, this anchoring position is specified to be at the vehicle lower side relative to the aforementioned imaginary line VL (see FIG. 2). Apart from the above descriptions, structures of this exemplary embodiment are similar to the first exemplary embodiment.

In this exemplary embodiment too, the swing restriction tab 90 restricts upward swinging with respect to the vehicle 12 by the front portion 40F of the inflated and expanded curtain airbag 40. Thus, this exemplary embodiment provides basically the same operation and effects as the first exemplary embodiment.

Third Exemplary Embodiment

FIG. 11 shows a sectional diagram, corresponding with portions of FIG. 4, of partial structure of a curtain airbag device for a vehicle 110 according to a third exemplary embodiment of the present disclosure. This exemplary embodiment has a basically similar structure to the first exemplary embodiment, but the anchoring position and method of anchoring of the swing restriction tab 90 at the edge protector 80 differ from the first exemplary embodiment.

The edge protector 80 according to this exemplary embodiment is equipped with an X-rib 112 that serves as an anchoring protrusion, which projects diagonally toward the vehicle width direction outer side and vehicle upper side from a vicinity of an upper end portion of the protector main body 82. The X-rib 112 is formed in an "X" shape as viewed in the projection direction thereof. The X-rib 112 is fitted into and anchored at an attachment hole formed in the inner panel 32. Thus, the protector main body 82 is supported at the inner panel 32 (the vehicle body panel). The X-rib 112 further penetrates through an anchoring hole 116 formed in the swing restriction tab 90, and a portion of the swing restriction tab 90 is sandwiched between the protector main body 82 and the inner panel 32. Therefore, the swing restriction tab 90 is anchored at the roof side portion 20 via the X-rib 112, that is, via the edge protector 80. In this exemplary embodiment too, the anchoring position of the swing restriction tab 90 with respect to the roof side portion 20 is specified to be at the vehicle lower side relative to the aforementioned imaginary line VL (see FIG. 2). Apart from the above descriptions, structures of this exemplary embodiment are similar to the first exemplary embodiment.

In this exemplary embodiment too, the swing restriction tab 90 restricts upward swinging with respect to the vehicle 12 by the front portion 40F of the inflated and expanded curtain airbag 40. Thus, this exemplary embodiment provides basically the same operation and effects as the first exemplary embodiment. In addition, in this exemplary embodiment, the swing restriction tab 90 is anchored to the roof side portion 20 using the X-rib 112 provided at the edge protector 80. Some already available edge protectors (resin cases) are provided with the X-rib 112. Therefore, an already available edge protector may be employed as is.

These exemplary embodiments have structures in which the swing restriction tab 90 is anchored at the roof side portion 20 via the edge protector 80 (a resin case). However, this is not limiting; structures are possible in which the swing restriction tab 90 is anchored to the roof side portion 20 directly.

It will be clear that numerous modes may be embodied within a scope that does not depart from the gist of the present disclosure. It will also be clear that the scope of the present disclosure is not to be limited to the exemplary embodiments described above.

What is claimed is:

1. A curtain airbag device for a vehicle, comprising;
   a curtain airbag including a plurality of tabs projecting toward an upper side of the vehicle from an upper edge portion of the curtain airbag, the plurality of tabs being anchored at a roof side portion, the curtain airbag being stowed in the roof side portion in a folded state, the curtain airbag being configured to receive a supply of gas and inflating and expanding toward a lower side of the vehicle, and a front portion of the curtain airbag including a front seat oblique collision chamber that configures a front end portion of the curtain airbag and that inflates to the lower side of the vehicle relative to a door beltline and is superposed in the vehicle width direction with a door trim; and
   a swing restriction tab projecting from the upper edge portion of the front seat oblique collision chamber, the swing restriction tab being anchored at the roof side portion at the lower side of the vehicle with respect to an imaginary line that runs along the curtain airbag in the folded state and passes through anchoring points of the plurality of tabs at the roof side portion, and the swing restriction tab restricting upward swinging with respect to the vehicle by the front portion of the inflated and expanded curtain airbag.

2. The curtain airbag device for a vehicle according to claim 1, further comprising:
   a resin case in which the folded curtain airbag is stowed, the resin case being fixed to the roof side portion and the swing restriction tab being anchored at the resin case, and the swing restriction tab being anchored at the roof side portion via the resin case.

3. The curtain airbag device for a vehicle according to claim 2, wherein:
   the resin case extends in the vehicle front-and-rear direction at the vehicle rear of an A-pillar garnish; and
   the swing restriction tab is anchored at a front end portion of the resin case.

4. The curtain airbag device for a vehicle according to claim 2, wherein:
   the swing restriction tab extends towards the vehicle width direction outer side of the resin case through a penetrating hole formed in a vicinity of an opening edge at the vehicle width direction outer side of the resin case, and
   the swing restriction tab is anchored at an anchoring portion of an outer side flange, the anchoring portion formed at the lower side the vehicle of the penetrating hole.

5. The curtain airbag device for a vehicle according to claim 2, wherein:
   the swing restriction tab is anchored at an anchoring portion through a penetrating hole formed in a vicinity of the opening edge at the vehicle width direction outer side of the resin case, and
   the anchoring portion projects to the vehicle width direction outer side from the resin case at the upper side the vehicle of an outer side flange.

6. The curtain airbag device for a vehicle according to claim 2, wherein:
the resin case includes an X-rib that serves as an anchoring protrusion, the X-rib projects diagonally toward the vehicle width direction outer side and the upper side of the vehicle from a vicinity of an upper end portion of the resin case;
the X-rib is fitted into and anchored at an attachment hole formed in an inner panel of an A-pillar; and
the X-rib penetrates through an anchoring hole formed in the swing restriction tab, and a portion of the swing restriction tab is sandwiched between the resin case and the inner panel.

7. The curtain airbag device for a vehicle according to claim 1, wherein the swing restriction tab extends toward the lower side of the vehicle from the upper edge portion of the front portion of the curtain airbag and is anchored at the roof side portion.

8. The curtain airbag device for a vehicle according to claim 1, further comprising:
a resin case in which the folded curtain airbag is stowed, the resin case being fixed to the roof side portion and the swing restriction tab being anchored at the resin case, and wherein:
the swing restriction tab is anchored at the roof side portion via the resin case,
the roof side portion includes a vehicle body panel in which an attachment hole is formed,
the resin case includes an anchoring projection which is fitted into and anchored at the attachment hole,
an anchoring hole is formed in the swing restriction tab, and
the anchoring projection penetrates through the anchoring hole.

9. The curtain airbag device for a vehicle according to claim 8, wherein the swing restriction tab extends toward the lower side of vehicle from the upper edge portion of the front portion of the curtain airbag and is anchored at the roof side portion.

10. The curtain airbag for a vehicle according to claim 1, further comprising an inflator configured to provide the supply of gas for inflating and expanding the curtain airbag.

11. The curtain airbag for a vehicle according to claim 10, further comprising:
a collision sensor configured to predict or detect a collision,
a controller configured to receive output from the collision sensor, and
wherein the controller is configured to control the inflator based on the output from the collision sensor.

12. The curtain airbag for a vehicle according to claim 10, further comprising:
a rollover sensor configured to predict or detect a rollover,
a controller configured to receive output from the rollover sensor, and
wherein the controller is configured to control the inflator based on the output from the rollover sensor.

* * * * *